US010519584B2

(12) United States Patent
Na et al.

(10) Patent No.: US 10,519,584 B2
(45) Date of Patent: Dec. 31, 2019

(54) VIBRATION DAMPER AND WASHING MACHINE INCLUDING THE SAME

(71) Applicant: Samsung Electronics Co., Ltd., Gyeonggi-do (KR)

(72) Inventors: Gyu-sung Na, Gyeonggi-do (KR); Min-sung Kim, Gyeonggi-do (KR); Sung Han, Gyeonggi-do (KR); Jeong-hoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 15/436,627

(22) Filed: Feb. 17, 2017

(65) Prior Publication Data

US 2017/0292215 A1  Oct. 12, 2017

(30) Foreign Application Priority Data

Apr. 12, 2016 (KR) .................. 10-2016-0045088

(51) Int. Cl.
| | |
|---|---|
| D06F 37/22 | (2006.01) |
| D06F 37/20 | (2006.01) |
| F16F 7/09 | (2006.01) |
| F16F 15/02 | (2006.01) |
| F16F 7/08 | (2006.01) |
| D06F 37/24 | (2006.01) |

(52) U.S. Cl.
CPC .............. *D06F 37/22* (2013.01); *D06F 37/20* (2013.01); *D06F 37/24* (2013.01); *F16F 7/08* (2013.01); *F16F 7/09* (2013.01); *F16F 15/02* (2013.01); *F16F 15/022* (2013.01); *F16F 2222/04* (2013.01); *F16F 2232/08* (2013.01)

(58) Field of Classification Search
CPC .......... D06F 37/20; D06F 37/22; D06F 37/24; F16F 7/08; F16F 7/09; F16F 15/02; F16F 15/022
See application file for complete search history.

(56) References Cited

U.S. PATENT DOCUMENTS

| 4,934,493 A | 6/1990 | Bauer et al. | |
|---|---|---|---|
| 6,318,526 B1 * | 11/2001 | Kruckemeyer | F16F 9/362 188/322.17 |

(Continued)

FOREIGN PATENT DOCUMENTS

| DE | 3811742 A1 | 10/1989 |
|---|---|---|
| DE | 19940191 A1 | 3/2001 |

(Continued)

OTHER PUBLICATIONS

European Search Report dated Jan. 26, 2017 in connection with European Patent Application No. EP 16 19 6172.

(Continued)

*Primary Examiner* — Joseph L. Perrin

(57) ABSTRACT

A vibration damper and a washing machine including the same are disclosed. The vibration damper includes a tappet, a supporting rod slidably coupled to the tappet, a friction unit disposed inside the tappet and configured to rub the supporting rod, and a cap coupled to one end of the tappet and including a plurality of supporting blocks. The plurality of supporting blocks support an outer circumference of the supporting rod with non-uniform bearing power.

19 Claims, 15 Drawing Sheets

(56) References Cited

U.S. PATENT DOCUMENTS

| | | | |
|---|---|---|---|
| 7,341,132 B2 | 3/2008 | Peuker et al. | |
| 2005/0183912 A1 | 8/2005 | Peuker et al. | |
| 2006/0054440 A1* | 3/2006 | Peuker | D06F 37/20 |
| | | | 188/381 |
| 2007/0039792 A1* | 2/2007 | Peuker | D06F 37/20 |
| | | | 188/322.16 |
| 2014/0090939 A1* | 4/2014 | Kanioz | F16F 7/09 |
| | | | 188/271 |
| 2015/0020552 A1* | 1/2015 | Yu | D06F 37/265 |
| | | | 68/23.3 |

FOREIGN PATENT DOCUMENTS

| | | |
|---|---|---|
| EP | 1584730 A2 | 10/2005 |
| KR | 20040069704 A | 8/2004 |
| KR | 100517610 B1 | 9/2005 |
| KR | 100628152 81 | 9/2006 |
| KR | 1020060095682 A | 9/2006 |
| KR | 101392422 B1 | 5/2014 |
| KR | 20150053305 A | 5/2015 |
| WO | 2010103349 A1 | 9/2010 |

OTHER PUBLICATIONS

European Patent Office, "Communication of a notice of opposition," Application No. EP16196172.7, dated May 8, 2019, 56 pages.

\* cited by examiner (a)   (b)

VIBRATION DAMPER AND WASHING MACHINE INCLUDING THE SAME

CROSS-REFERENCE TO RELATED APPLICATIONS

This application claims priority from Korean Patent Application No. 10-2016-0045088, filed on Apr. 12, 2016, in the Korean Intellectual Property Office, the disclosure of which is incorporated herein by reference in its entirety.

BACKGROUND OF THE INVENTION

Field of the Invention

Apparatuses and methods consistent with exemplary embodiments relate to a vibration damper and a washing machine including the same, and more particularly, to a vibration damper capable of reducing transfer force due to steady-state variation of a washing machine and variably adjusting a design amplitude in the steady-state vibration and a washing machine including the same.

Description of the Related Art

In general, washing machines may be an apparatus which washes laundry by performing washing, rinsing, and dewatering cycles.

The washing machines may be divided into a pulsator type which washes laundry through impacts of water flow generated in response to a rotary blade, to which a small blade is attached in a lower portion of a washing tub, being rotated, an agitator type which washes laundry through water flow formed through regular change of direction of a large stirring blade to which a blade is attached in a center of a washing tub, and a drum type which puts laundry in a drum and washes the laundry through impacts of a waterfall by drum rotation and detergency of detergent.

The drum type washing machines may have advantages of less damage of laundry, a small amount of a washing solution, collective cycles of washing, rinsing, and dry of the laundry, and no entanglement of the laundry as compared with other washing methods. The preference of the consumer on the drum type washing machines may be gradually increased due to the washing effect.

However, the vibration and noise may occur by the drum rotated during washing in the drum type washing machines. Dampers may be installed in the drum type washing machines to reduce the vibration and noise. The dampers may employ a vibration reduction method by applying friction force of a friction member to a supporting rod.

The vibration caused in the drum type washing machines may be the deepest problem in a dewatering process. This is because the eccentric laundry inside the drum may cause the large vibration during high-speed rotation.

The vibration in the dewatering process of the drum type washing machines may be divided into transient vibration generated in a drum acceleration process and a steady-state vibration in reaching the steady state.

The steady-state vibration may have the small amplitude in the dewatering of the drum washing machines, but the steady-state vibration may cause unpleasant vibration and noise to the user in response to a weak material such as wood being used for a structure for supporting the washing machine in Europe. Accordingly, the method for effectively reducing the steady-state vibration in the dewatering may be urgently needed.

There is a need for tuning the amplitude of the steady-state vibration of the damper to a predetermined value due to a manufacturing error and the like even in response to the damper being designed by setting the amplitude of the steady-state vibration in the dewatering to a predetermined value by the designer.

SUMMARY OF THE INVENTION

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a vibration damper capable of effectively reducing steady-state vibration in dewatering of a drum washing machine and a washing machine including the same.

One or more exemplary embodiments relate to a vibration damper capable of tuning amplitude of steady-state vibration in dewatering to a predetermined value and a washing machine including the same.

According to an aspect of an exemplary embodiment, there is provided a vibration damper including a tappet; a supporting rod slidably coupled to the tappet; a friction unit disposed inside the tappet and configured to rub the supporting rod; and a cap coupled to one end of the tappet and including a plurality of supporting blocks. The plurality of supporting blocks may support an outer circumference of the supporting rod with non-uniform bearing power.

According to an aspect of an exemplary embodiment, there is provided a washing machine including a washing machine main body; a drum installed inside the washing machine main body; a tub configured to rotatably support the drum; and a variation damper configured to support the tub. The vibration damper may include a tappet; a supporting rod slidably coupled to the tappet; a friction unit configured to rub the supporting rod inside the tappet according to vibration of the tappet; and a cap which is coupled to one end of the tappet and the supporting rod passes therethrough. The cap may include a plurality of supporting blocks and the plurality of supporting blocks may support an outer circumference of the supporting rod with non-uniform bearing power.

Additional aspects and advantages of the exemplary embodiments are set forth in the detailed description, and will be obvious from the detailed description, or may be learned by practicing the exemplary embodiments.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
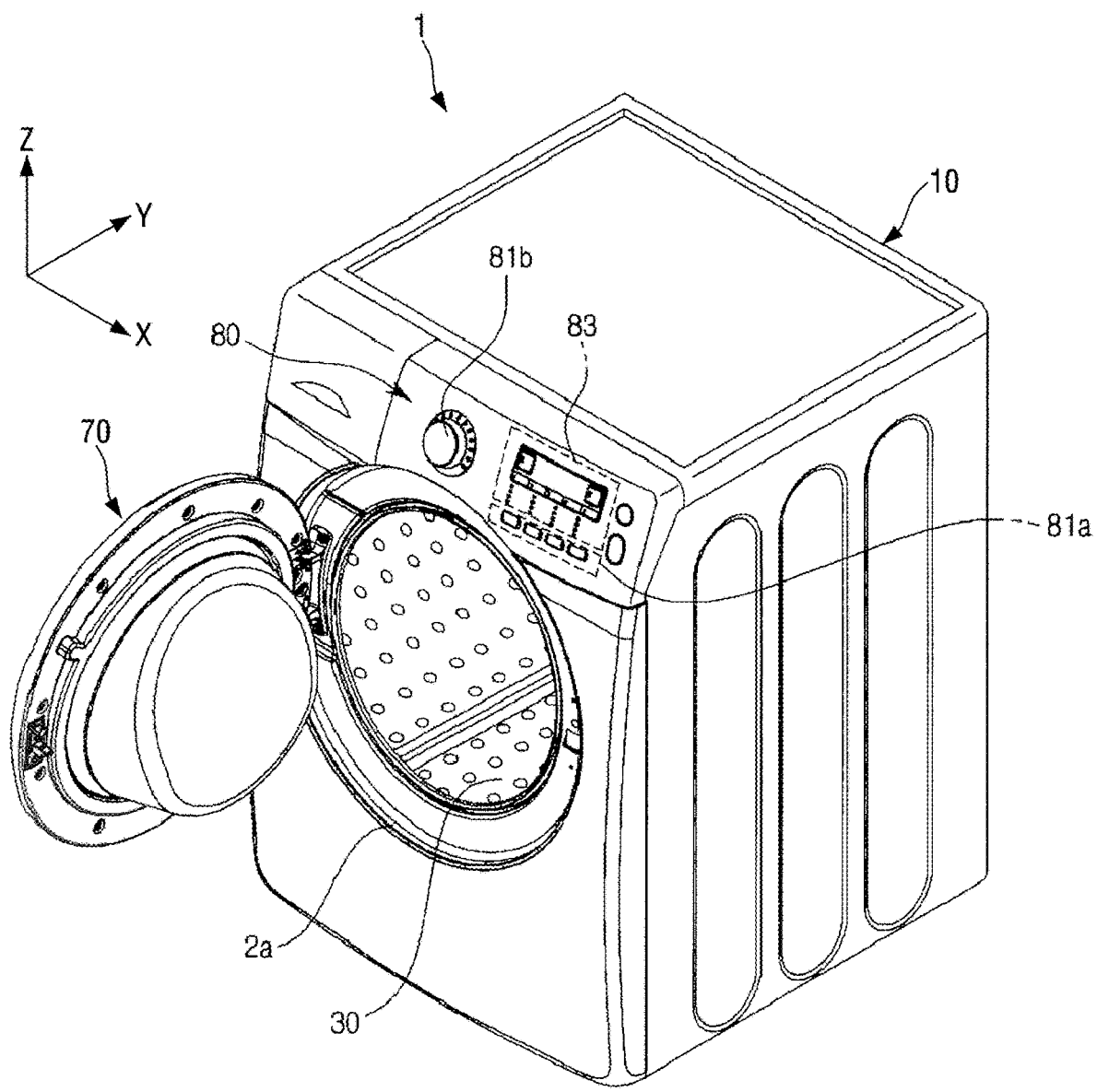
FIG. 1 is a perspective view illustrating an outer appearance of a washing machine according to an exemplary embodiment.

Various embodiments will now be described more fully with reference to the accompanying drawings in which some embodiments are shown. The techniques described herein are exemplary, and should not be construed as implying any particular limitation on the present disclosure. It should be understood that various alternatives, combinations and modifications could be devised by those skilled in the art. In the following description, unless otherwise described, the same reference numerals are used for the same elements when they are depicted in different drawings.

It will be understood that the terms first, second, third, etc. may be used herein to describe various elements and/or components regardless of the order and/or importance, and these elements and/or components should not be limited by these terms. These terms are only used to distinguish one element or component. For example, a first user apparatus and a second user apparatus may refer to user apparatuses different from each other regardless of the order or importance. Thus, without departing from the scope in the document, a first element and/or component discussed below could be termed a second element and/or component, and vice versa.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined in the document should not be interpreted to exclude embodiments herein.

Figure 2A:
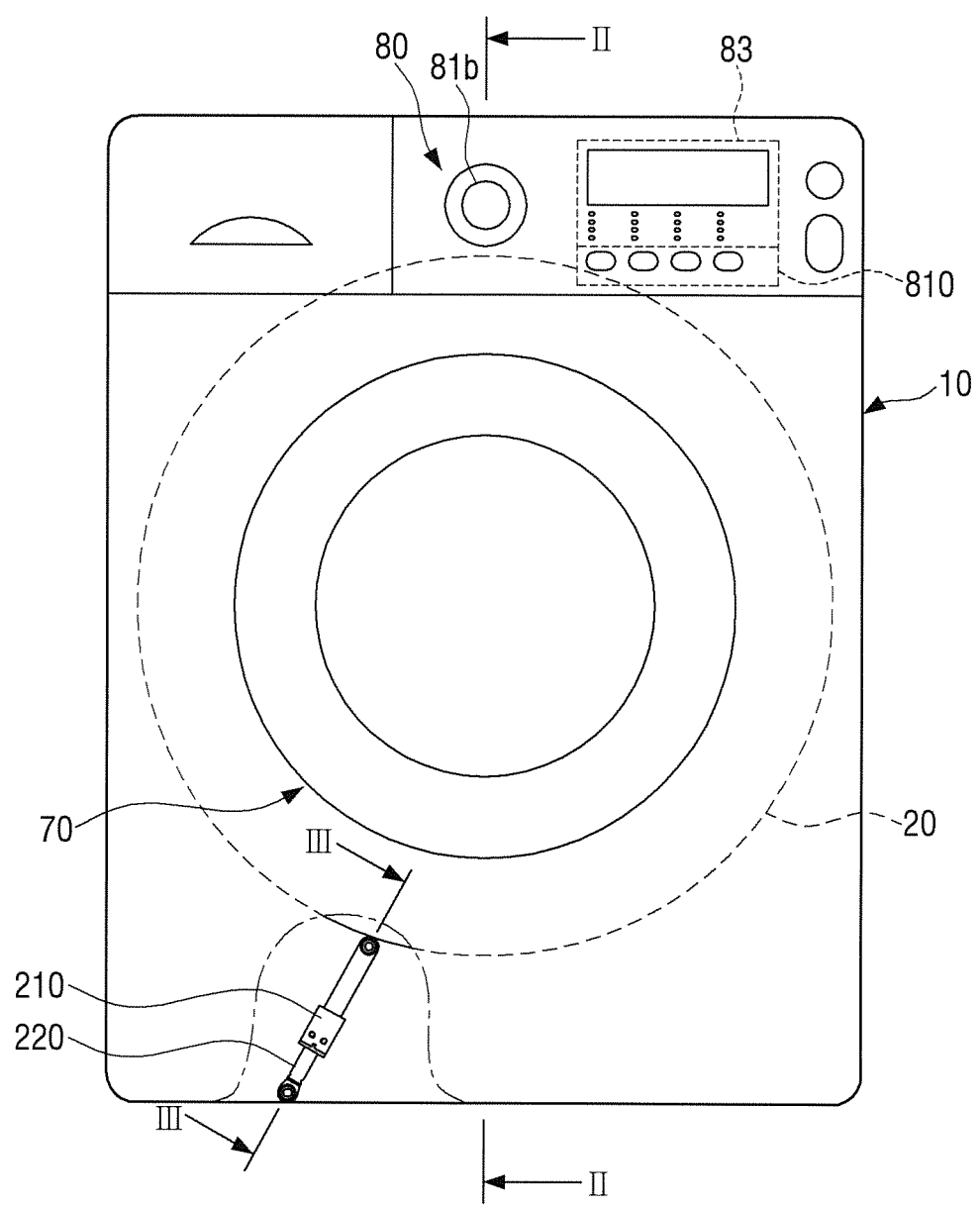
FIG. 2A is a front view illustrating an outer appearance of a washing machine according to an exemplary embodiment.
Figure 2B:
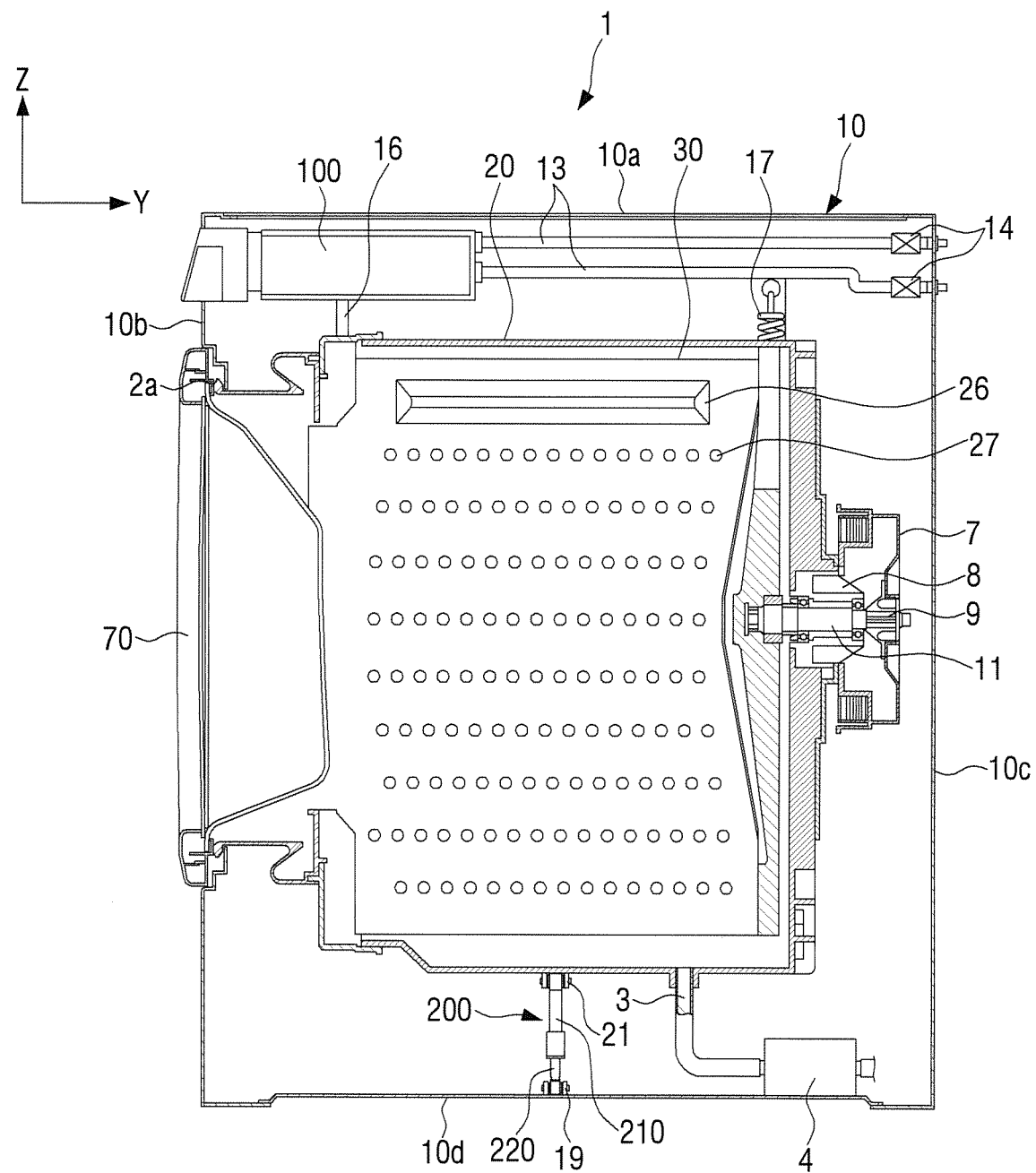
FIG. 2B is a cross-sectional diagram illustrating the washing machine taken along line II-II of FIG. 2A.

FIG. 1 is a perspective view illustrating an outer appearance of a washing machine according to an exemplary embodiment, FIG. 2A is a front view illustrating an outer appearance of a washing machine according to an exemplary embodiment wherein FIG. 2A is a diagram illustrating the washing machine mounted with a vibration damper in which a bottom-left portion of the washing machine is taken, and FIG. 2B is a cross-sectional diagram illustrating the washing machine taken along line II-II of FIG. 2A.

As illustrated in FIG. 1 and FIG. 2A, a washing machine 1 may include a cabinet 10 configured to form an outer appearance of the washing machine 1, a tub 20 configured to receive a washing water or a rinsing water to be used in a washing cycle or a rinsing cycle, a drum 30 configured to laundry, and a motor 7 configured to rotate the drum 30.

A control panel 80 including input units 81a and 81b configured to receive an operation command of the washing machine 1 from the user and a display 83 configured to display operation information of the washing machine 1 may be provided.

The input units 81a and 81b may receive a command of the user related to an operation of the washing machine 1 such as a washing time, the number of rinsing, a dewatering time, a dry time, an operation, and a pause and may include a pressurized button 81a and a rotary button 81b. The display 83 may display information related to the operation of the washing machine 1 such as an amount of washing water, a cycle which is performing in the washing machine 1, and a time remaining until the washing is completed, and the display 83 may employ a liquid crystal display (LCD) panel, a light emitting diode (LED) panel, and the like.

The input units 81a and 81b and the display 83 are separately provided in the washing machine 1 according to an exemplary embodiment, but this is not limited thereto, and the input units and the display may be integrally provided using a touch screen panel (TSP).

Referring to FIG. 2B, the cabinet 10 may include frames 10a, 10b, 10c, and 10d. The frames 10a, 10b, 10c, and 10d may be configured of a top frame 10a which forms a top surface of the cabinet 10, a front frame 10b and a rear frame 10c which form a front surface and a rear surface of the cabinet 10, and side frames (not shown) and a bottom frame 10d which couple the front frame 10b and the rear frame 10c and form lateral surfaces and a bottom surface of the cabinet 10.

An inlet 2a may be formed in the front frame 10b of the cabinet 10 to put the laundry into the inside of the drum 30. The inlet 2a may be opened and closed through a door 70 installed in the front frame 10b of the cabinet 10.

A spring 17 configured to support the tub 20 in an upper side may be provided between the tub 20 and the cabinet 10. The spring 17 may alleviate the vibration and noise generated by floating of the tub 20 due to elasticity of the spring 17.

A water supply pipe 13 configured to supply the washing water to the tub 20 may be installed over the tub 20. A water supply valve 14 may be installed in one side of the water supply pipe 13.

A detergent supply device 100 may be coupled to the tub 20 through a connection pope 16. Water supplied through the water supply pipe 13 may be supplied to the inside of the tub 20 together with detergent via the detergent supply device 100.

A driving shaft 11 configured to transfer power of the motor 7 may be coupled to a rear surface of the drum 30. A plurality of through holes 27 for flow of the washing water may be formed in a circumference of the drum 30. A plurality of lifters 26 may be installed in an inner circumference of the drum 30 to allow the laundry to rise and drop in rotating of the drum 30.

The driving shaft 11 may be disposed between the drum and the motor 7. One end of the driving shaft 11 may be coupled to a rear plate of the drum 30 and the other end of the driving shaft 11 may extend toward an outer side of a rear wall of the tub 20. In response to the driving shaft 11 being driven through the motor 7, the drum 30 coupled to the driving shaft 11 may be rotate on the basis of the driving shaft 11.

A bearing housing 8 may be installed in the rear wall of the tub 20 to rotatably support to the driving shaft 11. The bearing housing 8 may be formed of an aluminum alloy, and may be inserted into the rear wall of the tub 20 in injection molding of the tub 20. Bearings 9 may be installed between the bearing housing 8 and the driving shaft 11 to smoothly rotate the driving shaft 11.

A drain pump 4 configured to discharge water in the inside of the tub 20 to the outside of the cabinet 10, a connection hose 3 configured to couple the tub 20 and the drain pump 4 to allow the water in the inside of the tub 20 to flow in the drain pump 4, and a drain hose configured to guide the water pumped through the drain pump 4 to the outside of the cabinet 10 may be provided below the tub 20. A plurality of legs (not shown) may be installed in a bottom surface of the cabinet 10.

The tub 20 may be supported by a damper 200. The damper 200 may couple an inner bottom surface of the cabinet 10 and an outer surface of the tub 20. The damper 200 may be located in an upper side and left and right sides of the cabinet 10 in addition to the inner bottom surface of the cabinet 10 to support the tub 20. The damper 200 or the spring 17 may alleviate vibration and shock generated by the up and down movement of the tub 20 between the top and bottom of the tub 20.

Figure 3:
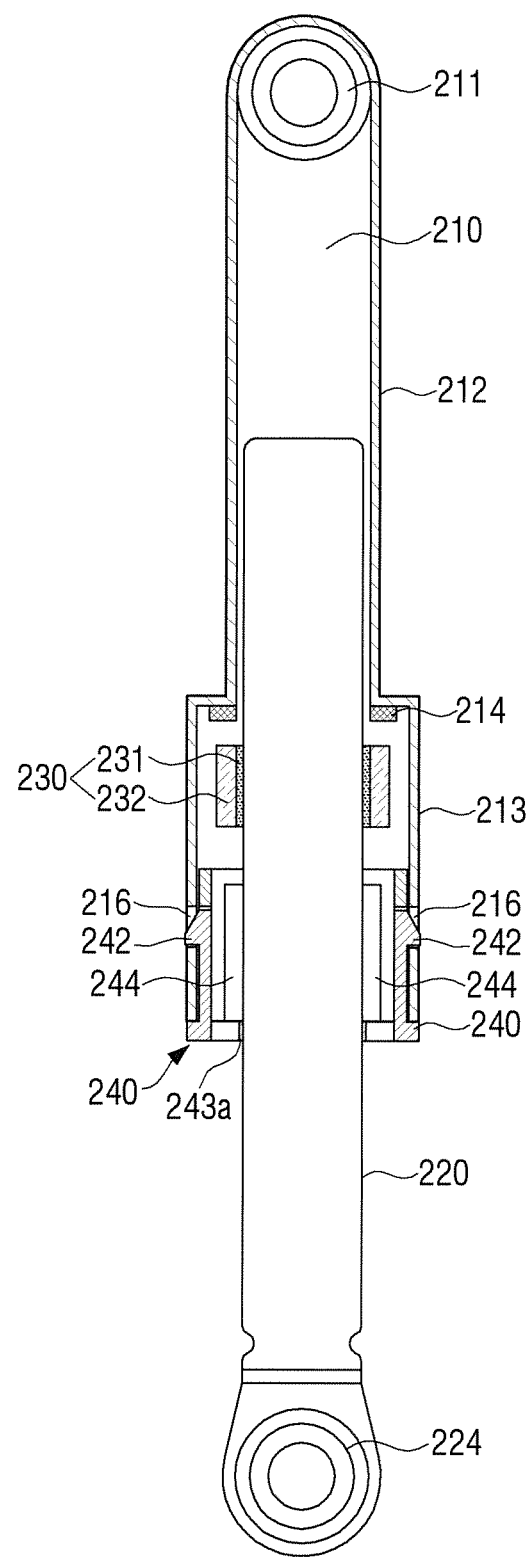
FIG. 3 is an assembly diagram illustrating a vibration damper according to an exemplary embodiment.

FIG. 3 is an assembly diagram illustrating a vibration damper according to an exemplary embodiment.

Referring to FIG. 3, the damper 200 according to an exemplary embodiment may include a tappet 210, a supporting rod 220, and a cap 240.

A tappet holder 211 may be formed in one end of the tappet 210 to be hinge-coupled to a tappet fixed end (see 21 of FIG. 2B) formed at both sides below the tub 20, and the other end of the tappet 210 may be formed in a cylindrical shape.

A plurality of hook holes 216 to which a plurality of hooks 242 formed in the cap 240 are coupled may be formed in the tappet 210. The plurality of hooks 242 may be symmetrically arranged in a circumferential direction with respect to an axis direction of the tappet 210 and the plurality of hook holes 216 may also be symmetrically arranged in the circumferential direction with respect to the axis direction of the tappet 210.

A vibration-proof rubber (not shown) may be interposed within the tappet holder 211 to reduce the vibration in response to the tappet holder 211 being fastened to the tappet fixed end 21 with a bolt.

One end of the supporting rod 220 may be formed in a cylindrical shape having a smaller diameter than the other end of the tappet 210. A supporting rod holder 224 may be formed in the other end of the supporting rod 220 to be hinge-coupled to a supporting rod fixed end (see 19 of FIG. 2B) formed in the bottom frame 10d of the cabinet 10.

Like the tappet holder 211, a vibration-proof rubber (not shown) may be interposed within the supporting rod holder 224 to reduce the vibration in response to the supporting rod holder 224 being fastened to the supporting rod fixed end 19 with a bolt.

The supporting rod 220 may be coupled to the tappet 210 so that one end of the supporting rod 220 is inserted into the inside of the tappet 210 to slidably reciprocate along the inside of the tappet 210.

The tappet 210 may include a rod unit 212 and a chamber 213. The rod unit 212 may serve to guide the movement of the supporting rod 220. The chamber 213 may be formed in one end of the rod unit 212 and may be formed to have a larger outer diameter than the rod unit 212.

The supporting rod 220 may pass through the chamber 213 of the tappet 210 and slide along the rod unit 212. Lubricant may be coated in the inside of the tappet 210 to facilitate the motion of the supporting rod 220.

A friction unit 230 may be arranged in the inside of the chamber 213. The friction unit 230 may include a friction member 231 and a bracket 232. The friction member 231 may be in tight contact with the outer circumference of the supporting rod 220 and allow the friction force to act on the supporting rod 220. The friction member 231 may be attached and fixed to the inner circumference of the bracket 232 using an adhesive and the like. The types of the friction member 231 and the adhesive may be arbitrarily selected by considering economics, production convenience, and the like by the user.

The friction unit 230 may run in the inside of the chamber 213 according to the movement of the supporting rod 220. The friction unit 230 may run within a preset gap. The gap may be regulated by an upper gap projection 214 and a lower gap projection 244.

The upper gap projection 214 may be integrally formed in an inner upper surface of the chamber 213 on the basis of a posture that the damper 200 is mounted. The upper gap projection 214 may restrict the upward movement of the sliding friction unit 230. A plurality of upper gap projections 214 may be formed along the circumferential direction on the basis of a center axis of the tappet 210.

The cap 240 which supports the supporting rod 220 may be fastened to one end (opening) of the chamber 213.

Figure 4:
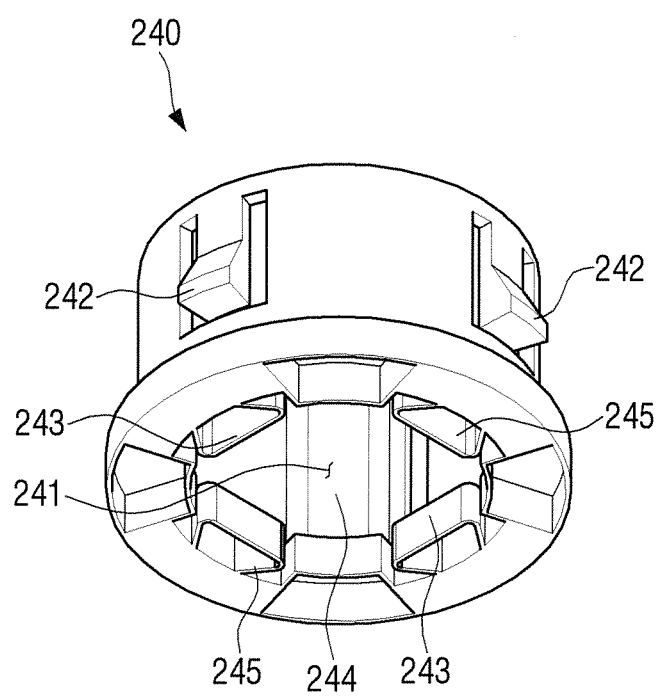
FIG. 4 is a perspective view illustrating a cap according to an exemplary embodiment.
Figure 5:
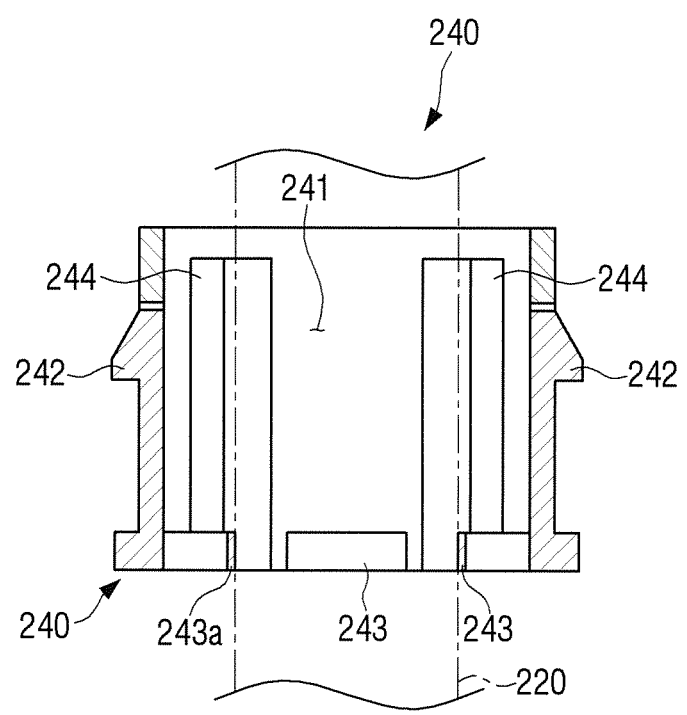
FIG. 5 is a cross-sectional diagram illustrating a cap according to an exemplary embodiment.

FIG. 4 is a perspective view illustrating a cap according to an exemplary embodiment and FIG. 5 is a cross-sectional diagram illustrating a cap according to an exemplary embodiment.

Referring to FIGS. 4 and 5, a circular through hole 241 may be formed in the center of the cap 240 so that the supporting rod 220 can slide along a longitudinal direction of the tappet 210.

The plurality of hooks 242 which are fastened to the tappet 210 may be formed in an outer circumference of the cap 240. The plurality of hooks 242 may be arranged on the outer circumference of the cap 240 in a circumferential direction. The plurality of hooks 242 may be symmetrically formed on the basis of the longitudinal direction of the tappet 210. The plurality of hooks 242 may be snap-coupled to the plurality of hook holes 216 formed in the inner lateral surface of the chamber in the longitudinal direction of the tappet 210.

The lower gap projection 244 may be integrally formed in the inner side of the cap 240 along the longitudinal direction of the tappet 210 to restrict the downward movement of the sliding friction unit 230. The lower gap projection 244 may be arranged in a circumferential direction on the basis of the through hole 241 of the cap 240.

A plurality of supporting blocks 243 may be formed in the cap 240 in a circumferential direction of the cap 240 on the basis of the through hole 241 to slidably support the supporting rod 220 which reciprocates. The plurality of supporting blocks 243 may be symmetrically arranged.

Figure 6:
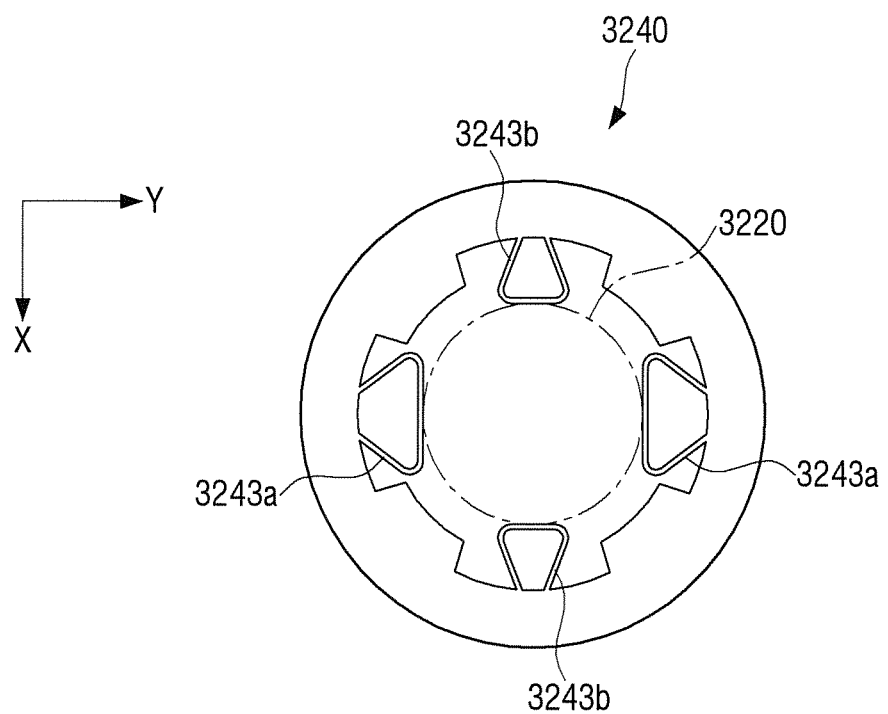
FIG. 6 is a plan view illustrating a cap according to an exemplary embodiment.

FIG. 6 is a plan view illustrating a cap according to an exemplary embodiment.

Referring to FIG. 6, the plurality of supporting blocks 3243 may be formed in such a manner that a width of a supporting block 3243*a* in a front and back direction (Y-direction of a coordinate system) of the drum washing machine on the basis of a posture that the damper is mounted may be larger than that of a supporting block 3243*b* in other direction. For example, the supporting block 3243*a* in the Y direction may be wider than the supporting block 3243*b* in an X-direction in FIG. 6.

The bearing power transferred through the wide-width supporting block may be larger than that transferred through the narrow-width supporting block. For example, the bearing powers of the plurality of supporting blocks which support the supporting rod may be non-uniform.

In the drum washing machine mounted with the drum 30 in a front and back direction (the Y-direction of the coordinate system in FIG. 1), the vibration which occurs in the front and back direction may be smallest. Accordingly, most of transfer force may act through the wide-width supporting block in the front and back direction (the Y-direction of the coordinate system) in a steady-state vibration state in dewatering of the drum washing machine, and thus the vibration transferred to the frame through the supporting block may be minimized.

Figure 7:
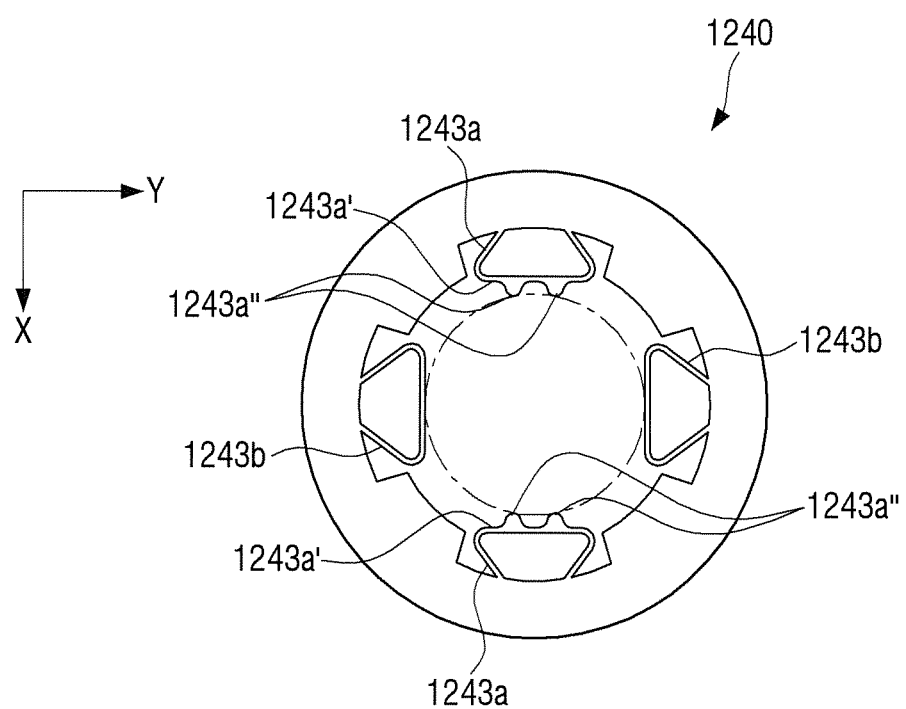
FIG. 7 is a plan view illustrating a cap according to another exemplary embodiment.

FIG. 7 is a plan view illustrating a cap according to another exemplary embodiment.

Referring to FIG. 7, a contact projection 1243*a*″ may be formed in a contact surface 1243*a*′ of a supporting block 1243*a* in other direction other than the front and back direction (the Y-direction of the coordinate system) of the drum washing machine. An area of the supporting block, which is in contact with the supporting rod in the contact surface 1243*a*′ in which the contact projection 1243*a*″ is formed, may be an end area of the contact projection 1243*a*″. Accordingly, the contact area of the contact surface in which the contact projection 1243*a*″ is formed may be reduced, and the bearing power through the supporting block in which the contact projection 1243*a*″ is formed may also be reduced.

For example, the bearing powers that the supporting block 1243*a* including the contact projection 1243*a*″ and the supporting block 1243*b* including no contact projection support the supporting rod may be non-uniform.

Since the vibration in the front and back direction is smallest in the drum washing machine mounted with the drum 30 in the front and back direction (see the Y-direction of the coordinate system of FIG. 1), most of transfer force may act through the supporting block 1243*b* of the front and back direction (the Y-direction of the coordinate system) in which the contact projection is not formed in the contact surface in the steady-state vibration state in dewatering of the drum washing machine, and thus the vibration transferred to the frame through the supporting block may be minimized.

Figure 8:
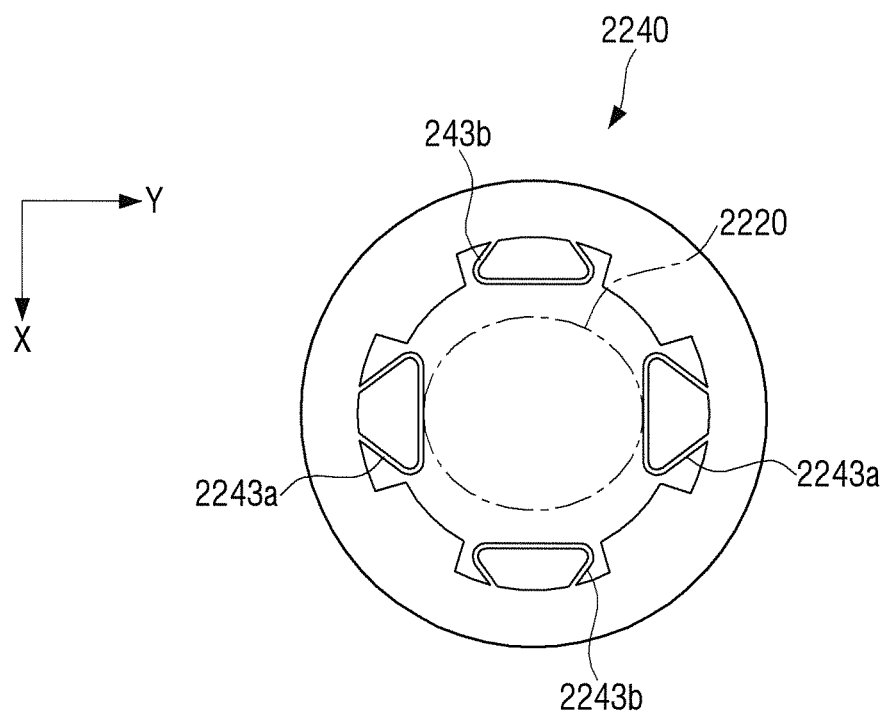
FIG. 8 is a plan view illustrating a cap assembled with a supporting rod according to another exemplary embodiment.

FIG. 8 is a plan view illustrating a cap assembled with a supporting rod according to another exemplary embodiment.

Referring to FIG. 8, a supporting rod 2220 having an elliptical cross-section may be coupled to the same four supporting blocks.

Since the cross-section of the supporting rod 2220 is an elliptical shape, the bearing power may be transferred only to a main axis of the supporting rod through the supporting block, and the bearing power may not be transferred to other direction.

Since the vibration in the front and back direction is smallest in the drum washing machine mounted with the drum 30 in the front and back direction (see the Y-direction of the coordinate system of FIG. 1), the bearing power may act only through a supporting block 2243*a* of the front and back direction (the Y-direction of the coordinate system) in the steady-state vibration state in dewatering of the drum washing machine and the bearing power may not act on a supporting block 2243*b* of a left and right direction (the X-direction of the coordinate system), and thus the vibration transferred to the frame through the plurality of supporting blocks may be minimized.

Figure 9:
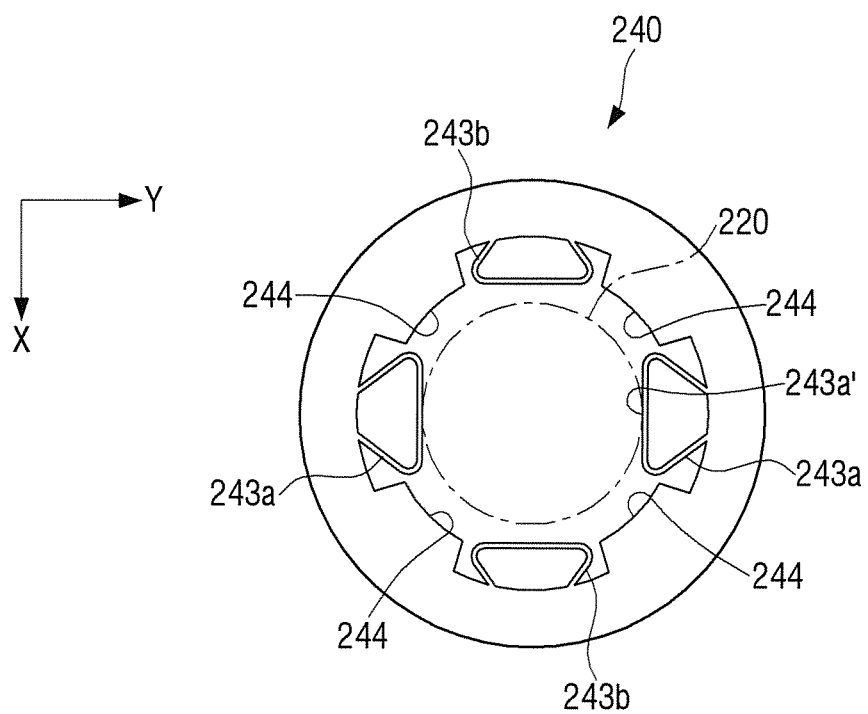
FIG. 9 is a plan view illustrating a cap according to another exemplary embodiment.

FIG. 9 is a plan view illustrating a cap according to another exemplary embodiment.

Referring to FIG. 9, a supporting block 243*a* in the front and back direction (the Y-direction of the coordinate system) of the drum washing machine may be in contact with a supporting rod and a supporting block 243*b* in other direction may not be in contact with the supporting rod 220 through reduction in thickness thereof.

The supporting block 243*b* in the X-direction in the drawings may not be in contact with the supporting rod 220 in the steady-state vibration state, but the supporting block 243*b* may be in contact with the supporting rod 220 and support the supporting rod 220 in the transient vibration state.

Accordingly, the bearing power may act only through the supporting block 243*a* of the front and back direction (the Y-direction of the coordinate system) in the steady-state vibration state in dewatering of the drum washing machine, and thus the vibration transferred to the frame through the supporting block may be minimized.

Figure 10:
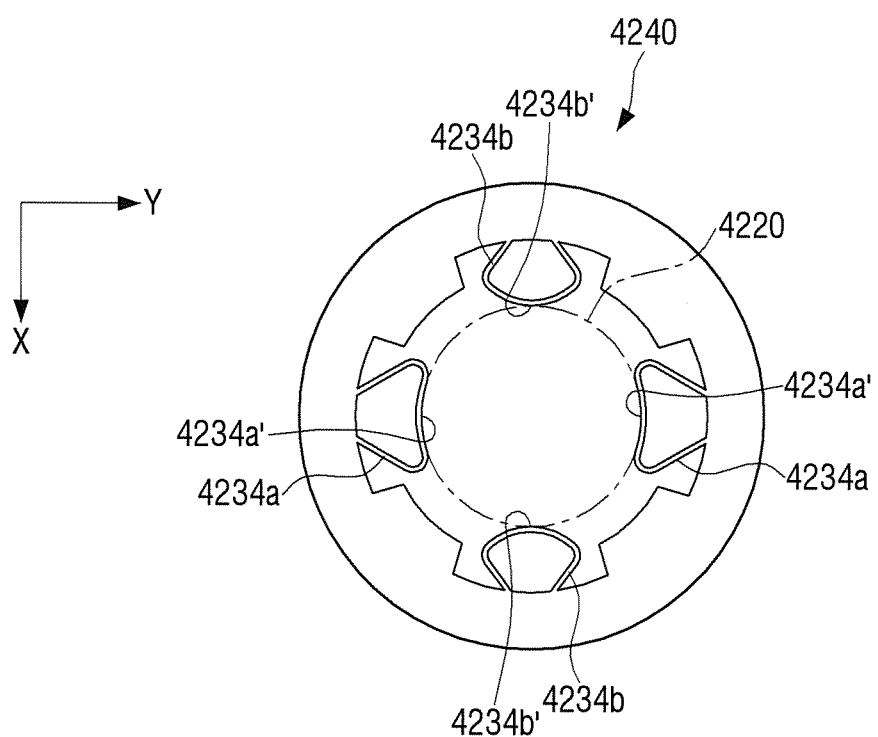
FIG. 10 is a plan view illustrating a cap according to another exemplary embodiment.

FIG. 10 is a plan view illustrating a cap according to another exemplary embodiment.

Referring to FIG. 10, a contact surface 4234*a*′ of a supporting block 4234*a* in the front and back direction (the Y-direction of the coordinate system) of the drum washing machine, which is in contact with a supporting rod 4220, may have an concave shape and a contact surface 4234*b*′ of a supporting block 4234*b* in other direction may have a convex shape. The contact surface of the supporting block may be formed in a curved surface other than a plane.

The supporting block of which the contact surface has a convex shape may have a contact area smaller than the supporting block of which the contact surface has a concave shape. Accordingly, the bearing power transferred through the supporting block of which the contact surface is the concave may be larger than that transferred through the supporting block of which the contact surface has the convex. That is, the bearing powers that the plurality of supporting blocks support the supporting rod may be non-uniform.

Since the vibration in the front and back direction is smallest in the drum washing machine mounted with the drum 30 in the front and back direction (see the Y-direction of the coordinate system of FIG. 1), most of the transfer force may act only through the supporting block of which the contact surface has a concave shape in the steady-state vibration state in dewatering of the drum washing machine, and thus the vibration transferred to the frame through the supporting block may be minimized.

FIGS. 6 to 10 illustrate various modifications of the cap that the bearing power through the supporting block is non-uniform. The transfer of the bearing power through the supporting block may be reduced through suitable adjustment of the bearing powers of the plurality of supporting blocks.

Hereinafter, an operation of the vibration damper 200 will be described with reference to FIG. 11 which illustrates the operation of the vibration damper in the transient vibration and FIG. 3 which illustrates the steady-state vibration state of the vibration damper.

Figure 11:
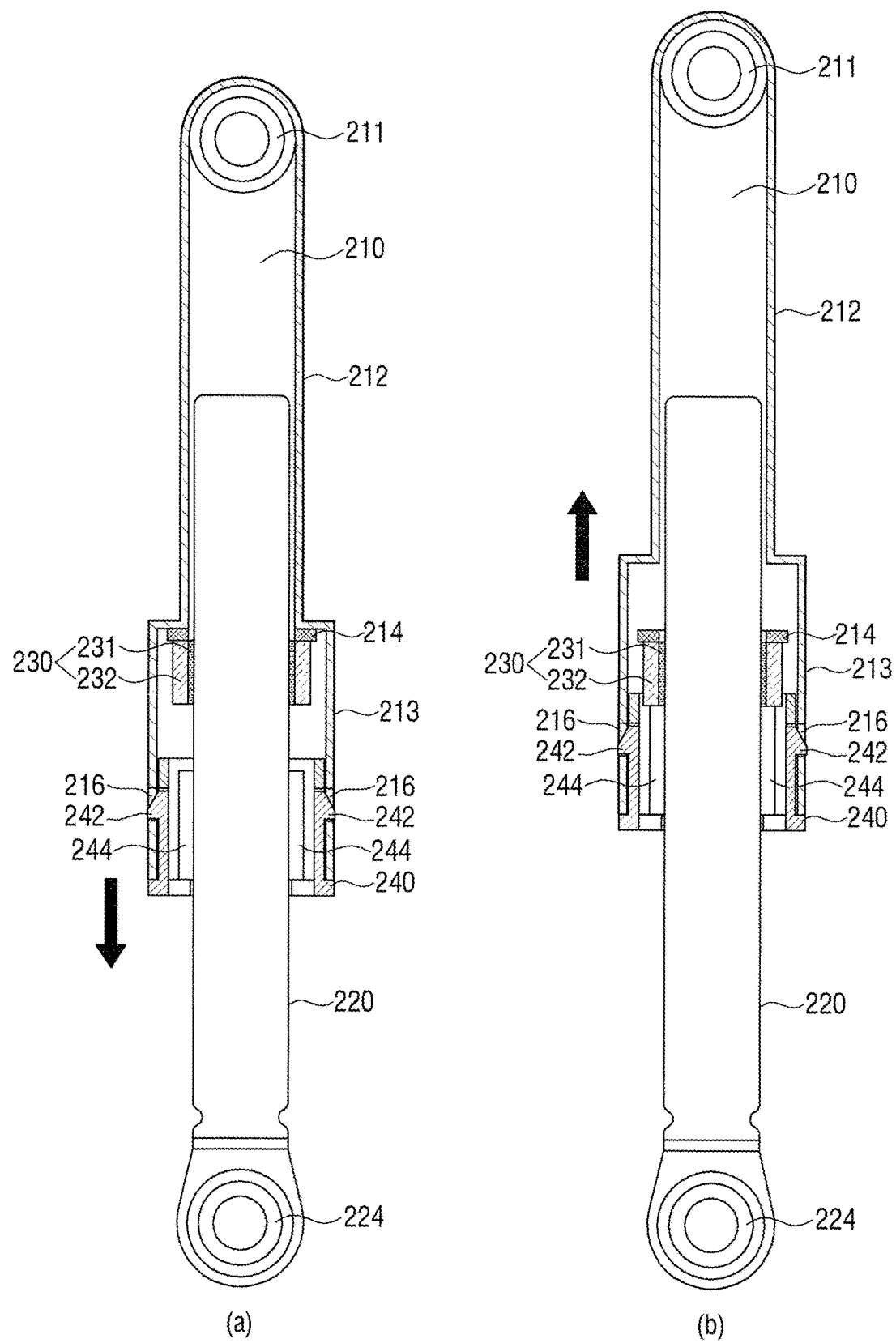
FIG. 11 is a diagram illustrating an operation in transient vibration of a vibration damper according to an exemplary embodiment.

FIG. 11 is a diagram illustrating an operation of a vibration damper in transient vibration according to an exemplary embodiment, wherein FIG. 11(a) illustrates the vibration damper in response to a friction unit reaching an upper portion of a chamber and FIG. 11(b) illustrates the vibration damper in response to the friction unit reaching a lower portion of the chamber.

Referring to FIG. 11, the supporting rod 220 may move over a gap formed by the upper and lower gap projections 214 and 244 in the transient vibration state of the damper 200. Accordingly, the friction unit 230 may reciprocate between a position (FIG. 11(a)) that the friction unit 230 reaches the upper portion of the chamber 213 and a position (FIG. 11(b)) that the friction unit 230 reaches the lower portion of the chamber 213. The friction force may act while a relative motion occurs between a friction pad of the friction unit 230 and the supporting rod 220 in both edge positions.

As illustrated in FIG. 3, the supporting rod 220 may move within a period smaller than the gap formed by the upper and lower gap projections 214 and 244 in the steady-state vibration state differently from the transient vibration state. The supporting rod 220 may be inserted into the friction unit 230, and thus the supporting rod 220 may reciprocate within the gap together the friction unit 230.

The friction force may not act between the friction pad of the friction unit 230 and the supporting rod 220. The steady-state vibration through the tub (see 20 of FIG. 2) may be transferred to the frame 10d along the supporting block 243 of the cap 240.

Most of the transfer force may act only through the supporting block 243 in the front and back direction (the Y-direction of the coordinate system) which the smallest vibration is transferred therethrough, and thus the vibration transferred to the frame through the supporting block may be minimized.

Figure 12:
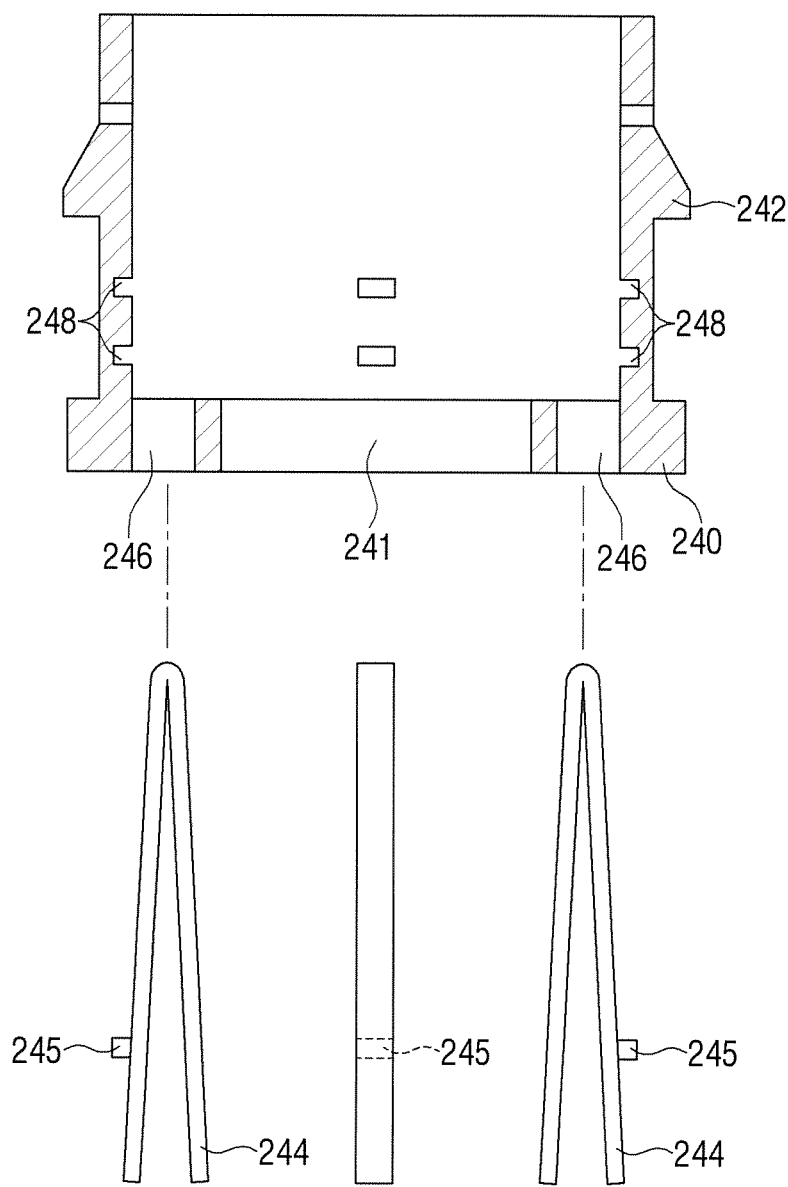
FIG. 12 is a diagram illustrating a variable gap projection according to an exemplary embodiment.

FIG. 12 is a diagram illustrating a variable gap projection according to an exemplary embodiment. In the variable gap projection according to an exemplary embodiment, the gap regulated through cap projections may be variably adjusted. The variable gap projection may include an upper gap projection and a lower gap projection.

The upper gap projection (see 214 of FIG. 11) may be integrally formed in an inner upper surface of the chamber 213 and fixed to the chamber 213. The lower gap projection 244 may be formed of a member separately from the cap 240 and a depth of the lower gap projection 244 which is inserted into the cap 240 may be adjusted. As the depth of the lower gap projection 244 which is inserted into the cap 240 is adjusted, the gap between the upper gap projection 214 and the lower gap projection 244 may be variably adjusted.

The lower gap projection 244 may be formed in a V shape. An insertion hole 246 into which the lower gap projection 244 is inserted may be formed in the cap 240. A plurality of lower gap projections 244 may be provided and a plurality of insertion holes 246 may be formed in the cap 240 in the circumferential direction of the cap 240 so that the plurality of lower gap projections may be inserted into the plurality of insertion holes 246.

An insertion pin 245 may be formed to protrude in one side of the V-shaped lower gap projection 244, and the insertion pin 245 may be selectively inserted into any one of a plurality of insertion grooves 248 formed in an inner wall of the cap 240 at interval along the longitudinal direction of the tappet 210. The gap may be adjusted according to a position of the insertion groove 248 into which the insertion pin 245 is inserted. The number of insertion grooves 248 may be necessarily larger than the number of steps which adjust a height of the lower gap projection.

Figure 13:
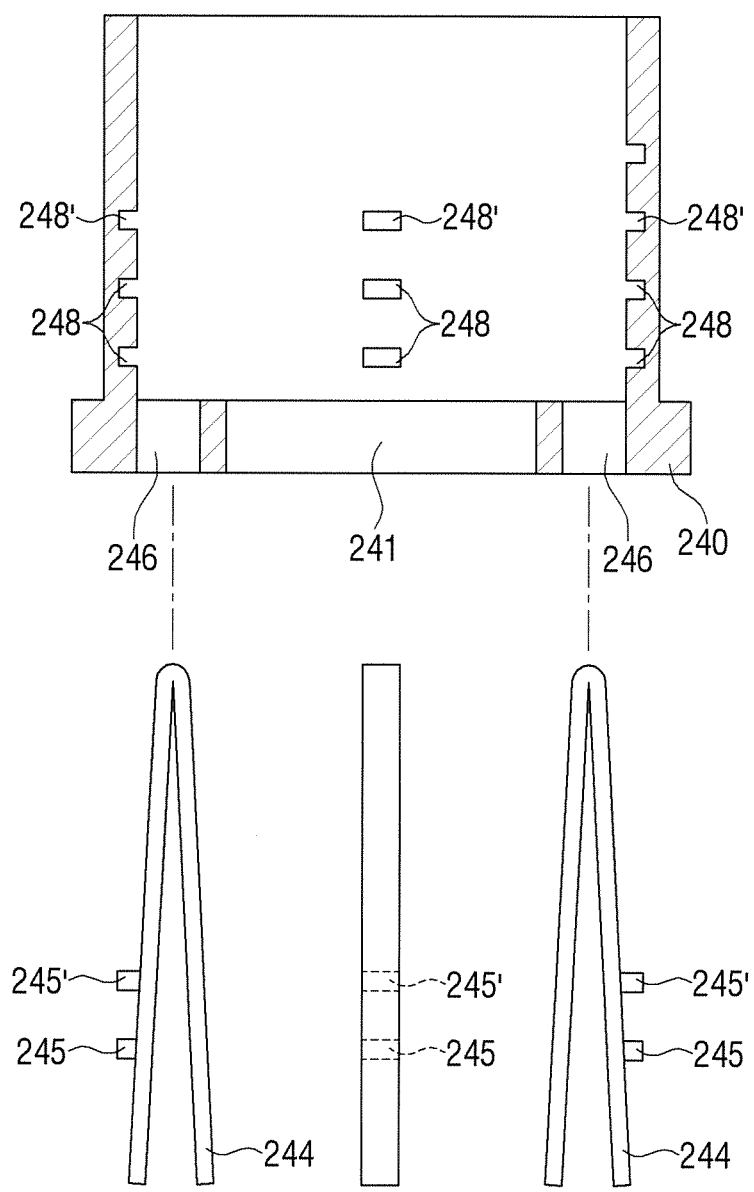
FIG. 13 is a diagram illustrating a lower gap projection in which a plurality of insertion pins are formed and a cap according to an exemplary embodiment.

FIG. 13 is a diagram illustrating the lower gap projection 244 in which a plurality of insertion pins 245 and 245' are formed and a cap according to an exemplary embodiment.

The plurality of insertion pins 245 and 245' may be formed in the lower gap projection 244 to enhance the fastening intensity of the lower cap projection 244 to the cap 240. The number of insertion grooves 248 and 248' which is larger than the number of the insertion grooves 248 formed in FIG. 12 may be formed in the cap 240.

The plurality of lower cap projections 244 illustrated in FIGS. 12 and 13 may be separately formed from each other. Thus, in response to the plurality of lower gap projections 244 being inserted into the cap 240, it may be inconvenient to insert the lower gap projections into the insertion grooves 248. To remove the inconvenience, the plurality of lower gap projections may be integrally formed.

Figure 14:
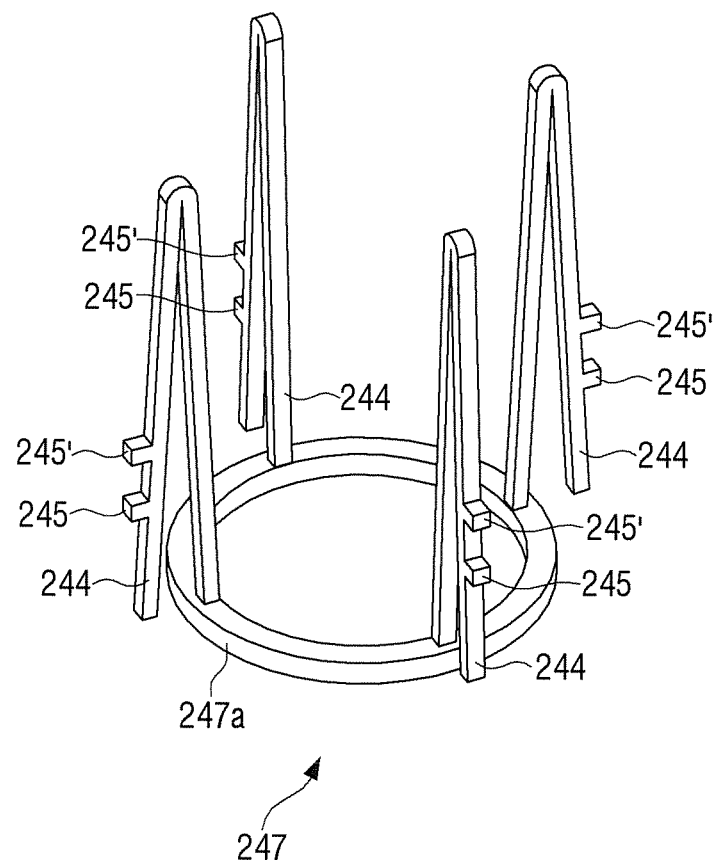
FIG. 14 is a diagram illustrating a variable gap projection according to another exemplary embodiment.

FIG. 14 is a diagram illustrating an example that a plurality of lower gap projections 244 are integrally formed to a ring 247a according to another exemplary embodiment.

The plurality of integrated lower cap projections 244 may be simultaneously inserted into the cap 240 only through one insertion operation while the user catch the ring 247a, and thus the insertion operation may be convenient.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A vibration damper that reduces vibration of a washing machine, the vibration damper comprising:
   a tappet;
   a supporting rod slidably coupled to the tappet;
   a friction unit disposed inside the tappet and configured to rub the supporting rod; and
   a cap coupled to one end of the tappet and including:
      a plurality of supporting blocks arranged along a circumferential direction of the supporting rod and configured to support the supporting rod, and
      a plurality of lower gap projections, each positioned between each supporting block of the plurality of supporting blocks,
   wherein the plurality of supporting blocks include a first pair of supporting blocks symmetrically disposed facing each other, and a second pair of supporting blocks symmetrically disposed facing each other, and
   wherein a first distance between the first pair of supporting blocks is shorter than a second distance between the second pair of supporting blocks.

2. The vibration damper as claimed in claim 1, wherein the first pair of supporting blocks are in contact with the supporting rod and the second pair of supporting blocks are not in contact with the supporting rod.

3. The vibration damper as claimed in claim 1, wherein areas of contact surfaces in the first pair of supporting blocks are different from areas of contact surfaces in the second pair of supporting blocks.

4. The vibration damper as claimed in claim 1, wherein the first pair of supporting blocks include different widths from the second pair of supporting blocks.

5. The vibration damper as claimed in claim 1, wherein each of the first pair of supporting blocks comprises at least one contact projection protruding from a surface thereof facing to the supporting rod.

6. The vibration damper as claimed in claim 1, wherein contact surfaces of the first pair of supporting blocks that are in contact with the supporting rod include a plane or a curved surface.

7. The vibration damper as claimed in claim 1, wherein contact surfaces of the first pair of supporting blocks that are in contact with the supporting rod include a concave shape or a convex shape.

8. The vibration damper as claimed in claim 1, wherein a cross-section of the supporting rod is a circular shape or an elliptical shape.

9. The vibration damper as claimed in claim 1, wherein the first pair of supporting blocks are arranged along a direction that a drum of the washing machine is mounted.

10. The vibration damper as claimed in claim 1, wherein a length of the friction unit is smaller than a space between an inner upper surface of the tappet and a top of the cap.

11. The vibration damper as claimed in claim 10, wherein:
an upper gap projection is arranged in the inner upper surface of the tappet, and
the plurality of lower gap projections are arranged in the top of the cap.

12. The vibration damper as claimed in claim 11, wherein:
each of the plurality of lower gap projections include:
a V shape, and
at least one insertion pin is formed in one side of each of the plurality of lower gap projections, and
the cap further includes:
a plurality of insertion holes, wherein each of the plurality of lower gap projections, is respectively inserted into one of the plurality of insertion holes, and
a plurality of insertion grooves that the at least one insertion pin is selectively inserted is formed in an inner wall of the cap in a longitudinal direction of the tappet.

13. The vibration damper as claimed in claim 12, wherein the at least one insertion pin is arranged in plural and each of the plurality of insertion holes correspond respectively to each of the at least one insertion pin.

14. The vibration damper as claimed in claim 11, wherein the plurality of lower gap projections is symmetrically arranged along the circumferential direction of the supporting rod.

15. A vibration damper comprising:
a tappet;
a supporting rod slidably coupled to the tappet;
a friction unit configured to rub the supporting rod inside the tappet through a movement of the tappet; and
a cap coupled to one end of the tappet and the supporting rod passes therethrough,
wherein the cap includes:
a plurality of supporting blocks arranged along a circumferential direction of the supporting rod and configured to support the supporting rod, and
a plurality of lower gap projections, each positioned between each supporting block of the plurality of supporting blocks,
wherein the plurality of supporting blocks include a first pair of supporting blocks symmetrically disposed facing each other, and a second pair of supporting blocks symmetrically disposed facing each other, and
wherein a first distance between the first pair of supporting blocks is shorter than a second distance between the second pair of supporting blocks.

16. The vibration damper as claimed in claim 15, wherein the first pair of supporting blocks are in contact with an outer circumference of the supporting rod along an inner side of the cap and the second pair of supporting blocks are not in contact with the outer circumference of the supporting rod along the inner side of the cap.

17. The vibration damper as claimed in claim 16, wherein the first pair of supporting blocks are arranged along a direction that a drum of a washing machine is mounted.

18. The vibration damper as claimed in claim 15, wherein contact surfaces of the first pair of supporting blocks that are in contact with the supporting rod, include a plane or a curved surface.

19. A washing machine comprising:
a washing machine main body;
a drum installed inside the washing machine main body;
a tub configured to rotatably support the drum; and
a vibration damper configured to support the tub,
wherein the vibration damper includes:
a tappet;
a supporting rod slidably coupled to the tappet;
a friction unit configured to rub the supporting rod inside the tappet through a movement of the tappet; and
a cap coupled to one end of the tappet and the supporting rod passes therethrough, wherein the cap includes:
a plurality of supporting blocks arranged along a circumferential direction of the supporting rod and configured to support the supporting rod, and
a plurality of lower gap projections, each positioned between each supporting block of the plurality of supporting blocks,
wherein the plurality of supporting blocks includes a first pair of supporting blocks symmetrically disposed facing each other, and a second pair of supporting blocks symmetrically disposed facing each other, and
wherein a first distance between the first pair of supporting blocks is shorter than a second distance between the second pair of supporting blocks.

* * * * *